(12) United States Patent
Higuchi et al.

(10) Patent No.: US 7,118,494 B2
(45) Date of Patent: Oct. 10, 2006

(54) MULTI-PIECE SOLID GOLF BALL

(75) Inventors: Hiroshi Higuchi, Chichibu (JP); Akira Kimura, Chichibu (JP); Toru Ogawana, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 95 days.

(21) Appl. No.: 11/039,909

(22) Filed: Jan. 24, 2005

(65) Prior Publication Data

US 2006/0166760 A1 Jul. 27, 2006

(51) Int. Cl.
*A63B 37/06* (2006.01)

(52) U.S. Cl. .................................... 473/373

(58) Field of Classification Search .............. 473/373, 473/374, 368
See application file for complete search history.

(56) References Cited

U.S. PATENT DOCUMENTS

| | | | | |
|---|---|---|---|---|
| 5,019,319 A | * | 5/1991 | Nakamura et al. | 473/373 |
| 5,306,760 A | | 4/1994 | Sullivan | |
| 5,312,857 A | | 5/1994 | Sullivan | |
| 6,659,889 B1 | | 12/2003 | Kasashima et al. | |
| 2005/0079928 A1 | * | 4/2005 | Kataoka et al. | 473/351 |

FOREIGN PATENT DOCUMENTS

| | | |
|---|---|---|
| JP | 60-258236 A | 12/1985 |
| JP | 61-258844 A | 11/1986 |
| JP | 7-24085 A | 1/1995 |
| JP | 8-243191 A | 9/1996 |
| JP | 10-151226 A | 6/1998 |
| JP | 2001-149505 A | 6/2001 |
| JP | 2001-149506 A | 6/2001 |
| JP | 2001-149507 A | 6/2001 |
| JP | 2001-170213 A | 6/2001 |
| JP | 2001-353233 A | 12/2001 |
| JP | 2002-315848 A | 10/2002 |
| JP | 2002-331046 A | 11/2002 |
| JP | 2003-190330 A | 7/2003 |
| JP | 2004-180733 A | 7/2004 |
| WO | WO 98/46671 A1 | 10/1998 |

* cited by examiner

*Primary Examiner*—Raeann Gorden
(74) *Attorney, Agent, or Firm*—Sughrue Mion, PLLC

(57) ABSTRACT

A multi-piece solid golf ball composed of a solid core, at least one intermediate layer, and a cover is characterized in that the core is made of a molded and vulcanized material obtained by vulcanizing a rubber composition containing (A) a base rubber which includes (a-1) a methacryloxy- and/or acryloxy-modified silicone polymer, and containing also an unsaturated carboxylic acid and/or a metal salt thereof, an organic peroxide and an inorganic filler, and has a diameter of 30 to 40 mm and a deflection under a 980 N (100 kg) load of 2.5 to 6.0 mm: the intermediate layer is made primarily of a thermoplastic resin and has a thickness of 0.5 to 2.5 mm and a surface Shore D hardness of 45 to 75; and the cover has a thickness of 0.2 to 2.5 mm and a surface Shore D hardness of 40 to 63 which is lower than the surface Shore D hardness of the intermediate layer. The golf ball has a deflection under a 980 N (100 kg) load of 2.0 to 4.0 mm.

9 Claims, No Drawings

MULTI-PIECE SOLID GOLF BALL

BACKGROUND OF THE INVENTION

The present invention relates to multi-piece solid golf balls having a solid core, at least one intermediate layer, and a cover.

Various improvements are being made in the compounding of golf ball materials so as to confer golf balls with an excellent rebound. But more is desired of a golf ball than just an excellent rebound; a range of other qualities, including a soft feel on impact and outstanding durability, are also desired as well. A major concern is how to provide to a high degree these different properties in a single golf ball. The ability to maintain a high rebound over a broad range in temperature is also important as one of these various properties desired in a golf ball.

Related art in which silicone components are incorporated so as to provide golf balls which are easy to mold and have both a stable flexibility and a high rebound over a broad temperature range includes golf balls in which a part of the ball is made of a composition containing at least one powder selected from among silicone rubber powders, silicon resin powders and composites thereof (JP-A 2001-170213, JP-A 2002-331046). However, there is room for further improvement in terms of obtaining golf balls that exhibit a stable rebound over a broad temperature range, yet also have a higher rebound. Additional art involving the incorporation of silicone powder within golf ball materials has also been disclosed (JP-A 2001-353233), but such art too falls short of satisfying the desires of golfers.

In addition to the above, other art that calls for compounding silicone components in golf ball-forming materials include the efforts, described in, for example, JP-A 60-258236, JP-A 61-258844 and JP-A 8-243191, to blend millable silicone rubber into a polybutadiene rubber or a cover layer resin, then to use a peroxide to effect crosslinking. However, it is not easy to microdisperse silicone rubber in polybutadiene rubber or to microdisperse polybutadiene rubber in silicone rubber. In the interest of improving certain properties, such as flow (injection moldability) during golf ball formation and durability of the golf ball, which are intimately associated with the morphology of the blended state between these two components, there exists a need for a way to achieve a better state of dispersion between the two components.

To address the desires of professional golfers and skilled amateurs, JP-A 7-24085 discloses a solid golf ball having a three-piece construction which is hard on the interior and soft at the exterior. JP-A 10-151226 describes such a golf ball which is also endowed with improved spin, flight characteristics and durability. Yet, even with these improvements, the golf balls often fall short of what is desired.

Multi-piece solid golf balls are also described in, for example, JP-A 2001-149505, JP-A 2001-149506, JP-A 2001-149507, JP-A 2002-315848, JP-A 2003-190330 and U.S. Pat. No. 6,659,889. However, further improvement in such balls continues to be desired.

SUMMARY OF THE INVENTION

The object of the invention is to provide solid golf balls having an improved rebound, increased carry, and good spin characteristics on approach shots.

The multi-piece solid golf ball of the invention is composed of a solid core, at least one intermediate layer, and a cover. The core is made of a molded and vulcanized material obtained by vulcanizing a rubber composition containing (A) a base rubber which includes (a-1) a methacryloxy- and/or acryloxy-modified silicone polymer, and containing also an unsaturated carboxylic acid and/or a metal salt thereof, an organic peroxide and an inorganic filler. The core has a diameter of 30 to 40 mm and a deflection under a 980 N (100 kg) load of 2.5 to 6.0 mm. The intermediate layer is made primarily of a thermoplastic resin, preferably an ionomer resin, and has a thickness of 0.5 to 2.5 mm and a surface Shore D hardness of 45 to 75. The cover has a thickness of 0.2 to 2.5 mm and a surface Shore D hardness of 40 to 63 which is lower than the surface Shore D hardness of the intermediate layer. The golf ball has a deflection under a 980 N (100 kg) load of 2.0 to 4.0 mm. The methacryloxy- and/or acryloxy-modified silicone polymer (a-1) is preferably a methacryloxy- and/or acryloxy-modified silicone rubber powder. The base rubber (A) may include also (a-2) an organic peroxide-crosslinkable rubber other than the methacryloxy- and/or acryloxy-modified silicone polymer, preferably a polybutadiene which has a cis-1,4 content of at least 40 wt %, and more preferably a polybutadiene which has a cis-1,4 content of at least 60 wt % and has been synthesized using a rare-earth catalyst. The polybutadiene is preferably a modified polybutadiene rubber obtained by synthesis using a neodymium catalyst followed by reaction with a terminal modifier.

In the multi-piece solid golf ball of the invention, it is also preferable for the intermediate layer to have a Shore D hardness higher than the surface shore D hardness of the core and the surface Shore D hardness of the cover. It is also preferable for the cover and the intermediate layer to have a surface Shore D hardness difference therebetween of 2 to 30. In addition, it is preferable for the cover to consist primarily of a thermoplastic polyurethane.

By including the modified silicone polymer within the core, the solid golf balls of the invention have an enhanced rebound, with the rebound at low temperatures also being improved, in addition to which they have an increased carry and, particularly at high head speeds, good flight characteristics. Moreover, because they have a hard intermediate layer on the inside and a soft cover on the outside, the inventive solid golf balls exhibit both a good carry and, on approach shots, good spin characteristics.

DETAILED DESCRIPTION OF THE INVENTION

The multi-piece solid golf ball of the invention has a solid core, at least one intermediate layer, and a cover. A three-piece solid golf ball having only one intermediate layer is preferred.

In the invention, the solid core is made of a molded and vulcanized material obtained by vulcanizing a rubber composition containing:

(A) a base rubber, (B) an unsaturated carboxylic acid or a salt thereof, (C) an organic peroxide, and (D) an inorganic filler.

The base rubber (A) includes (a-1) a methacryloxy- and/or acryloxy-modified silicone polymer.

Component (a-1) is preferably an acrylic-type modified silicone polymer. Using component (a-1) in the form of a powder, that is, using a methacryloxy-modified and/or acryloxy-modified silicone rubber powder, is advantageous because the silicone powder readily mixes with other rubbers and because it is partially crosslinked and thus makes it easy to optimize the hardness of the golf ball.

Commercial products can be used as this component (a-1). For example, preferred use can be made of DY33-719 (produced by Dow Corning Toray Silicone Co., Ltd.).

Aside from including above component (a-1), the base rubber (A) used in the invention is not subject to any particular limitation. However, from the standpoint of workability, it is desirable for the base rubber (A) to include also, together with component (a-1): (a-2) a peroxide-crosslinkable rubber other than methacryloxy- and/or acryloxy-modified silicone polymer.

It is advantageous for component (a-2) to be a polybutadiene having a cis-1,4 content of at least 40 wt %, preferably at least 60 wt %, more preferably at least 80 wt %, even more preferably at least 90 wt %, and most preferably at least 95 wt %. A polybutadiene having too low a cis-1,4 content may lower the rebound.

The polybutadiene has a Mooney viscosity ($ML_{1+4}$ (100° C.)) of generally at least 40, preferably at least 50, more preferably at least 52, and even more preferably at least 54, but generally not more than 140, preferably not more than 120, more preferably not more than 100, and even more preferably not more than 80. Too high a Mooney viscosity may lower the workability, whereas one that is too low may lower the rebound.

The term "Mooney viscosity" used herein refers to an industrial index of viscosity (JIS K6300) as measured with a Mooney viscometer, which is a type of rotary plastometer. The unit symbol used here is $ML_{1+4}$ (100° C.), where "M" stands for Mooney viscosity, "L" stands for large rotor (L-type), and "1+4" stands for a pre-heating time of 1 minute and a rotor rotation time of 4 minutes. The "100° C." indicates that measurement is carried out at a temperature of 100° C.

The polybutadiene has a polydispersity index Mw/Mn (where Mw is the weight-average molecular weight, and Mn is the number-average molecular weight) of generally at least 2.0, preferably at least 2.2, more preferably at least 2.4, and even more preferably at least 2.6, but generally not more than 8.0, preferably not more than 7.5, more preferably not more than 4.0, and even more preferably not more than 3.4. A polydispersity Mw/Mn which is too small may lower the workability, whereas one that is too large may lower the rebound.

When a polybutadiene is employed as component (a-2), the polymerization catalyst used to obtain the polybutadiene is not subject to any particular limitation. For example, use can be made of a nickel catalyst, a cobalt catalyst, or a rare-earth catalyst.

Exemplary rare-earth catalysts include known rare-earth catalysts made up of a combination of a lanthanide series rare-earth compound with an organoaluminum compound, an alumoxane, a halogen-bearing compound and an optional Lewis base.

Alternatively, the polybutadiene may be obtained by polymerization using a rare-earth catalyst, particularly a neodymium catalyst, followed by reaction of the active end groups on the polymer with a known terminal modifier (JP-A 2004-180733).

In addition to the above-described polybutadiene, if necessary, component (a-2) may include other diene rubbers as well, such as styrene-butadiene rubbers, natural rubbers, isoprene rubbers and ethylene-propylene-diene rubbers, insofar as the objects of the invention are attainable.

The amount of above component (a-1), as a proportion of the combined amount of components (a-1) and (a-2), is generally up to 100 wt %, preferably not more than 95 wt %, more preferably not more than 80 wt %, even more preferably not more than 70 wt %, and most preferably not more than 60 wt %, but generally at least 5 wt %, preferably at least 10 wt %, more preferably at least 15 wt %, and even more preferably at least 20 wt %. If the amount of component (a-1), as a proportion of the combined amount of components (a-1) and (a-2), is less than 5%, the golf ball may have a poor rebound or the rebound may decrease markedly at low temperatures.

The rubber composition used for making the inventive golf ball includes also, with respect to component A, above-mentioned component B so as to confer a suitable hardness and excellent resilience to the rubber composition when it has been molded under heat.

Illustrative examples of the unsaturated carboxylic acid of component B include acrylic acid, methacrylic acid, maleic acid and fumaric acid. Acrylic acid and methacrylic acid are especially preferred.

Illustrative examples of the metal salts of unsaturated carboxylic acids include the zinc salts and magnesium salts of unsaturated fatty acids, such as zinc methacrylate and zinc acrylate. The use of zinc acrylate is especially preferred.

The amount of component B included in the rubber composition per 100 parts by weight of component A is generally at least 10 parts by weight, preferably at least 15 parts by weight, and more preferably at least 20 parts by weight, but generally not more than 60 parts by weight, preferably not more than 50 parts by weight, more preferably not more than 45 parts by weight, and most preferably not more than 40 parts by weight. Too little component B relative to component A may result in a lower rebound, whereas too much may make the ball so hard that the feel upon impact is unpleasant and difficult to endure.

The organic peroxide used as component C may be a commercially available product, illustrative examples of which include Percumil D (produced by NOF Corporation), Perhexa 3M (NOF Corporation), Perhexa C(NOF Corporation), Perhexa HC(NOF Corporation), Perhexa TMH (NOF Corporation), and Luperco 231XL (Atochem Co.). If necessary, two or more different organic peroxides may be mixed and used together.

The organic peroxide may be used singly or as a combination of two or more thereof, although from the standpoint of rebound in particular it is preferable to use two or more. If (a) represents the organic peroxide having the shortest half-life at 155° C., (b) represents the organic peroxide having the longest half-life at 155° C., and the half-lives of (a) and (b) are denoted as $a_t$ and $b_t$ respectively, the half-life ratio $b_t/a_t$ is at least 7, preferably at least 8, more preferably at least 9, and even more preferably at least 10, but not more than 20, preferably not more than 18, even more preferably not more than 16, and most preferably not more than 14. Even with the use of two or more organic peroxides, at a half-life ratio outside of the above range, the ball rebound, compression and durability will be inferior.

It is desirable in this case for the half-life $a_t$ at 155° C. of organic peroxide (a) to be at least 5 seconds, preferably at least 10 seconds, and more preferably at least 15 seconds, but not more than 120 seconds, preferably not more than 90 seconds, and more preferably not more than 60 seconds; and for the half-life $b_t$ at 155° C. of organic peroxide (b) to be at least 300 seconds, preferably at least 360 seconds, and more preferably at least 420 seconds, but not more than 800 seconds, preferably not more than 700 seconds, and more preferably not more than 600 seconds. Organic peroxide (a)

is preferably 1,1-bis(t-butylperoxy)-3,5,5-trimethylcyclohexane, and organic peroxide (b) is preferably dicumyl peroxide.

The amount of this component C included per 100 parts by weight of component A is generally at least 0.1 part by weight, preferably at least 0.3 part by weight, more preferably at least 0.5 part by weight, and even more preferably at least 0.7 part by weight, but generally not more than 5 parts by weight, preferably not more than 4 parts by weight, more preferably not more than 3 parts by weight, and even more preferably not more than 2 parts by weight. Too little or too much component C relative to component A may make it impossible to achieve a good rebound, feel and durability.

The rubber composition for the inventive golf ball also includes, as component D, an inorganic filler for modifying the specific gravity of the ball so as to give it the proper weight and a suitable rebound. Specific examples of such inorganic fillers include zinc oxide, barium sulfate and calcium carbonate. The amount of component D included per 100 parts by weight of component A is generally at least 1 part by weight, preferably at least 3 parts by weight, more preferably at least 5 parts by weight, and even more preferably at least 7 parts by weight, but generally not more than 130 parts by weight, preferably not more than 50 parts by weight, more preferably not more than 45 parts by weight, and even more preferably not more than 40 parts by weight.

In addition to above essential components A to D, the rubber composition may optionally include also an antioxidant. A commercial antioxidant such as Nocrac NS-6, Nocrac NS-30 (both available from Ouchi Shinko Chemical Industry Co., Ltd.), and Yoshinox 425 (available from API Corporation) may be used for this purpose.

The amount of the antioxidant included per 100 parts by weight of component A is 0 or more part by weight, preferably at least 0.05 part by weight, more preferably at least 0.1 part by weight, and even more preferably at least 0.2 part by weight, but generally not more than 3 parts by weight, preferably not more than 2 parts by weight, more preferably not more than 1 part by weight, and even more preferably not more than 0.5 part by weight. Too much antioxidant may make it impossible to give the golf ball a good rebound and durability.

The rubber composition for the inventive golf ball may also include an organosulfur compound. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the zinc salts thereof; diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

The amount of the organosulfur compound included per 100 parts by weight of component A is generally at least 0.1 part by weight, preferably at least 0.2 part by weight, and more preferably at least 0.5 part by weight, but generally not more than 5 parts by weight, preferably not more than 4 parts by weight, more preferably not more than 3 parts by weight, and even more preferably not more than 2 parts by weight.

The solid core of the inventive golf ball is obtained by molding the above-described rubber composition under the application of heat. Heating (vulcanization or curing) conditions for obtaining this hot-molded material may be the same as those employed with known rubber compositions for golf balls. For example, vulcanization may be carried out at a temperature of 100 to 200° C. for a period of 10 to 40 minutes.

When the hot-molded material obtained from the rubber composition is used as the solid core, the core has a diameter of at least 30.0 mm, preferably at least 32.0 mm, more preferably at least 34.0 mm, and even more preferably at least 35.0 mm, but not more than 41.5 mm, preferably not more than 40.0 mm, more preferably not more than 39.5 mm, and even more preferably not more than 39.0 mm.

The hardness of the hot-molded core obtained from the rubber composition is not subject to any particular limitation. The molded core may have a cross-sectional hardness profile which is flat from the center to the surface thereof or which varies from the center to the surface. The core has a surface hardness, expressed in JIS-C hardness units, of at least 55, preferably at least 59, more preferably at least 62, even more preferably at least 67, and most preferably at least 72, but not more than 93, preferably not more than 90, more preferably not more than 87, even more preferably not more than 84, and most preferably not more than 80.

It is recommended that the solid core have a deflection, when subjected to a load of 980 N (100 kg), of preferably at least 2.5 mm, more preferably at least 2.7 mm, even more preferably at least 2.9 mm, and most preferably at least 3.2 mm, but not more than 6.0 mm, preferably not more than 5.5 mm, even more preferably not more than 5.0 mm, and most preferably not more than 4.5 mm. A core with too little deflection will worsen the feel of the golf ball upon impact and, particularly on long shots such as with a driver in which the ball incurs a large deformation, will subject the ball to an excessive increase in spin, reducing the carry. On the other hand, if the core is too soft, the ball will have less lively a feel when hit and a smaller rebound that shortens its carry, and will also have a poor durability to cracking with repeated impact.

The intermediate layer has a surface hardness, as expressed in Shore D hardness units, of at least 45, preferably at least 50, more preferably at least 53, even more preferably at least 58, and most preferably at least 63, but not more than 75, preferably not more than 73, more preferably not more than 72, even more preferably not more than 71, and most preferably not more than 69. If the intermediate layer is too soft, the spin rate on various shots increases, resulting in a shorter carry. In addition, the ball has too soft a feel upon impact. On the other hand, an intermediate layer which is too hard reduces the spin rate, thus lowering controllability, gives the ball too hard a feel, and results in a poor durability to cracking with repeated impact.

This surface hardness is the value obtained when the intermediate layer, with the core enclosed therein, is measured directly with a Shore D durometer.

The material making up the intermediate layer is composed primarily of a thermoplastic resin, preferably an ionomer resin.

The ionomer resin accounts preferably for at least 70 wt %, and most preferably at least 80 wt %, of the overall intermediate layer. A ternary complex consisting of a rubber component, a polyolefin component and a polyamide component may be used as the ionomer resin to improve the durability of the golf ball to cracking with repeated impact. Such a complex is structurally composed of a rubber and polyolefin matrix with fine polyamide fibers uniformly dispersed therein. An exemplary commercial product of this type is LA1060 (produced by Daiwa Polymer KK).

This complex is included in an amount of preferably 1 to 20 wt %, and most preferably 2 to 10 wt %.

For the golf ball to have a good rebound and a good durability to cracking with repeated impact, it is desirable that the ionomer resin be a lithium ionomer; that is, an ionomer resin neutralized with lithium ions. Commercially available ionomers of this type that may be used include Surlyn 7930 and Surlyn 7940 (produced by E.I. DuPont de Nemours & Co.).

Ionomer resins having a high acid content (preferably at least 16%, and most preferably at least 17%, but preferably not more than 22%, and most preferably not more than 20%) can be used to achieve a high rebound. Examples include Himilan AM7317 and Himilan AM7318 (both produced by DuPont-Mitsui Polychemicals Co., Ltd.).

The intermediate layer consisting primarily of ionomer resin can be made from a resin composition containing as the essential components (a) to (c) below:

(a) an olefin-unsaturated carboxylic acid random copolymer, an olefin-unsaturated carboxylic acid-unsaturated carboxylic acid ester random copolymer, a metal ion neutralization product of either of these copolymers, or a mixture of these copolymers and neutralization products;

(b) a fatty acid having a molecular weight of at least 280 or a derivative thereof; and (c) a basic inorganic metal compound capable of neutralizing the acid groups on components (a) and (b).

Resin compositions containing as the essential components (a) to (c) have a good thermal stability, flow and moldability, enabling golf balls of excellent rebound to be obtained. These materials are described below.

The olefin in component (a) is exemplified by olefins having generally at least 2, but not more than 8, and preferably not more than 6, carbons. Specific examples include ethylene, propylene, butene, pentene, hexene, heptene and octene. Ethylene is especially preferred.

The unsaturated carboxylic acid is exemplified by acrylic acid, methacrylic acid, maleic acid and fumaric acid. Acrylic acid and methacrylic acid are especially preferred.

The unsaturated carboxylic acid ester is preferably a lower alkyl ester of the foregoing unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylates (n-butyl acrylate, i-butyl acrylate) are especially preferred.

The random copolymer of above component (a) can be obtained by random copolymerization of the various above ingredients by a known method. Here, it is recommended that the unsaturated carboxylic acid content ("acid content") within the random copolymer be generally at least 2 wt %, preferably at least 6 wt %, and more preferably at least 8 wt %, but not more than 25 wt %, preferably not more than 20 wt %, and more preferably not more than 15 wt %. A low acid content may lower the rebound of the golf ball, whereas a high acid content may lower its durability.

The neutralization products of random copolymers in component (a) can be obtained by partially neutralizing acid groups on the random copolymers with metal ions. Illustrative examples of metal ions for neutralizing the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. Preferred metal ions include $Na^+$, $Li^+$, $Zn^{2+}$ and $Mg^{2+}$. The use of $Zn^{2+}$ is especially preferred. The degree of random copolymer neutralization by these metal ions is not subject to any particular limitation. Such neutralization products can be obtained by a known method. For example, the above metal ions can be introduced onto the above random copolymer using such compounds as the formates, acetates, nitrates, carbonates, bicarbonates, oxides, hydroxides or alkoxides of these metal ions.

Specific examples of above component (a) include Nucrel AN4311, Nucrel AN4318 and Nucrel 1560 (all products of DuPont-Mitsui Polychemicals Co., Ltd.); Himilan 1554, Himilan 1557, Himilan 1601, Himilan 1605, Himilan 1706, Himilan 1855, Himilan 1856 and Himilan AM7316 (all products of DuPont-Mitsui Polychemicals Co., Ltd.); and Surlyn 6320, Surlyn 7930, Surlyn 8120, Surlyn 8940, Surlyn 9910, Surlyn 9945 and Surlyn 8945 (all products of E.I. DuPont de Nemours & Co.). Of these, zinc-neutralized ionomer resins (e.g., Himilan AM7316) are preferred.

Component (b) is a fatty acid having a molecular weight of at least 280 or a derivative thereof. This component, which has an extremely small molecular weight compared to above component (a), helps improve the flow properties of the resin composition and notably increases the melt viscosity of the mixture. Moreover, the fact that this fatty acid (or fatty acid derivative) has a molecular weight of at least 280 and a high content of acid groups (or derivatives thereof) holds down the loss of rebound due to its addition.

The fatty acid or fatty acid derivative of component (b) may be an unsaturated fatty acid (or derivative thereof) containing a double bond or triple bond on the alkyl moiety, or it may be a saturated fatty acid (or derivative thereof) in which the bonds on the alkyl moiety are all single bonds. It is recommended that the number of carbons on the molecule be generally at least 18, and in particular at least 20, preferably at least 22, and more preferably at least 24, but not more than 80, and in particular not more than 60, preferably not more than 40, and more preferably not more than 30. Too few carbons may make it impossible to improve the heat resistance and may also make the acid group content so high as to diminish the flow improving effect due to interactions with acid groups on component (a). On the other hand, too many carbons increases the molecular weight, which may lower the flow improving effect.

Specific examples of the fatty acid of component (b) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred.

The fatty acid derivative of the invention is one in which the proton on the acid group of a fatty acid has been replaced, and is exemplified by metallic soaps in which the proton on the acid group of the fatty acid has been replaced with a metal ion. Metal ions that may be used in such metallic soaps include $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $CU2+$, $Sn^{2+}$, $Pb^{2+}$ and $Co^{2+}$. Of these, $Ca^{2+}$, $Mg^{2+}$ and $Zn^{2+}$ are especially preferred.

Specific examples of fatty acid derivatives that may be used as component (b) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

When using above components (a) and (b), it is also possible to employ a known metallic soap-modified ionomer (such as those mentioned in U.S. Pat. No. 5,312,857, U.S.

Pat. No. 5,306,760 and International Application WO 98/46671) as a combination of component (a) and component (b).

Component (c) of the invention is a basic inorganic metal compound which can neutralize the acid groups in above component (a) and component (b). Component (c) is included for the following reason. When component (a) and component (b) are used alone without including component (c), and especially when a metal-modified ionomer resin (e.g., the metallic soap-modified ionomer resins mentioned in the above-cited prior-art patent publications) is used alone, as shown below, the metallic soap and un-neutralized acid groups present on the ionomer undergo exchange reactions during mixture under heating, generating a fatty acid. Because the fatty acid has a low thermal stability and readily vaporizes during molding, it may cause molding defects. Moreover, if the fatty acid thus generated deposits on the surface of the molded article, it will substantially lower paint film adhesion.

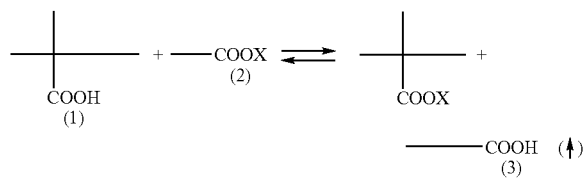

(1) un-neutralized acid group present on the ionomer resin (2) metallic soap (3) fatty acid $X^+$: metal cation Accordingly, to solve this problem, the above-described intermediate layer material includes also, as an essential component, a basic inorganic metal compound (c) which neutralizes the acid groups on components (a) and (b). By including component (c), the acid groups on components (a) and (b) are neutralized. Synergistic effects from the incorporation of each of these components both increases the thermal stability of the heated mixture and gives it a good moldability. Hence, the use of this mixture as the intermediate layer material has the very desirable effect of enhancing rebound by the ball.

Component (c), is not subject to any particular limitation, provided it is a basic inorganic metal compound which is capable of neutralizing the acid groups on components (a) and (b). However, it is recommended in particular that component (c) be a hydroxide because hydroxides have a high reactivity and the resulting reaction by-products contain no organic substances, enabling the degree of neutralization of the heated mixture to be increased without a loss of thermal stability.

Illustrative examples of the metal ions used in the basic inorganic metal compound include $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Sn^{2+}$, $Pb^{2+}$ and $Co^{2+}$. Basic inorganic metal compounds containing these metal ions may be used as the inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. However, as mentioned above, a hydroxide is preferred. Calcium hydroxide, which has a high reactivity with component (a), and particularly ionomer resins, is especially preferred.

The intermediate layer material compounded from above components (a), (b) and (c) can be provided with enhanced thermal stability, moldability and resilience. To this end, the components must be compounded in certain proportions. Specifically, the amount of component (b) included per 100 parts by weight of component (a) must be at least 5 parts by weight, preferably at least 10 parts by weight, and more preferably at least 15 parts by weight, but not more than 80 parts by weight, preferably not more than 40 parts by weight, and more preferably not more than 25 parts by weight. The amount of component (c) included per 100 parts by weight of component (a) must be at least 0.1 part by weight, preferably at least 1 part by weight, and more preferably at least 2 parts by weight, but not more than 10 parts by weight, preferably not more than 8 parts by weight, and more preferably not more than 6 parts by weight. Too little component (b) lowers the melt viscosity, resulting in inferior processability, whereas too much lowers the durability. As a result, the qualities desired of the intermediate layer cannot be achieved, which in turns compromises the performance of the golf ball. Too little component (c) fails to improve thermal stability and rebound, whereas too much instead lowers the heat resistance of the composition due to the presence of excess basic inorganic metal compound.

Other materials may be suitably included in the above resin composition, although it is preferable for the composition to be used after adjustment of its melt index as a heated mixture, as measured according to JIS-K6760 at a temperature of 190° C. and under a load of 21 N (2.16 kgf). It is recommended that the melt index be set to at least 0.5 dg/s, preferably at least 1.0 dg/s, and more preferably at least 1.5 dg/s, but generally not more than 20 dg/s, and preferably not more than 15 dg/s. If the heated mixture has too low a melt index, the result may be a marked decline in melt processability.

It is also preferable for the resin composition to have, in infrared absorption spectroscopy, a specific relative absorbance at the absorption peak attributable to carboxylate stretching vibrations at 1530 to 1630 $cm^{-1}$ with respect to the absorbance at the absorption peak attributable to carbonyl stretching vibrations normally detected at 1690 to 1710 $cm^{-1}$. This ratio may be expressed as follows: (absorbance at absorption peak for carboxylate stretching vibrations)/(absorbance at absorption peak for carbonyl stretching vibrations).

Here, "carboxylate stretching vibrations" refers to vibrations by carboxyl groups from which the proton has dissociated (metal ion-neutralized carboxyl groups), and "carbonyl stretching vibrations" refers to vibrations by undissociated carboxyl groups. The ratio between these respective peak intensities depends on the degree of neutralization. In the ionomer resins having a degree of neutralization of about 50 mol % which are commonly used, the ratio between these peak absorbances is about 1:1.

To improve the thermal stability, moldability and resilience as a material, it is recommended that the above resin composition have a carboxylate stretching vibration peak absorbance which is at least 1.5 times, and preferably at least 2 times, the carbonyl stretching vibration peak absorbance. The absence of any carbonyl stretching vibration peak is especially preferred.

The thermal stability of the above resin composition can be measured by thermogravimetry. It is recommended that, in thermogravimetry, the composition have a weight loss at 250° C., based on the weight of the composition at 25° C., of generally not more than 2 wt %, preferably not more than 1.5 wt %, and more preferably not more than 1 wt %.

In the above resin composition, the essential components of which are above-described components (a), (b) and (c), it is recommended that generally at least 50 mol %, preferably at least 55 mol %, more preferably at least 60 mol %, even more preferably at least 70 mol %, and most preferably at least 80 mol %, of the acid groups on essential components (a) and (b) be neutralized. A high degree of neutralization such as this makes it possible to more reliably suppress the exchange reactions that cause trouble when only the above-described component (a) and the fatty acid or fatty acid derivative of component (b) are used, thus preventing the generation of fatty acid. As a result, there can be obtained a material of greatly increased thermal stability and good processability which has a much higher resilience. To more reliably achieve a resin composition having both a high degree of neutrality and good flow, it is recommended that the acid groups in the essential components indicated above be neutralized with transition metal ions and with alkali metal and/or alkaline earth metal ions. Transition metal ions have a weaker ionic cohesion than alkali metal and alkaline earth metal ions and so neutralize some of the acid groups on the essential components, enabling the flow properties to be significantly improved.

The molar ratio between the transition metal ions and the alkali metal and/or alkaline earth metal ions is set as appropriate, generally in a range of 10:90 to 90:10, and especially 20:80 to 80:20. Too low a molar ratio of transition metal ions may fail to provide sufficient improvement in the flow properties of the material. On the other hand, a molar ratio that is too high may lower the rebound.

Specific examples of such metal ions include zinc ions as the transition metal ions and at least one type of ion selected from among sodium, lithium, magnesium and calcium ions as the alkali metal or alkaline earth metal ions.

No particular limitation is imposed on the method used to obtain a heated mixture in which the acid groups have been neutralized with transition metal ions and alkali metal or alkaline earth metal ions. Specific examples of methods of neutralization with transition metal ions, particularly zinc ions, include the use of a zinc soap as the fatty acid derivative, the use of a zinc ion neutralization product as component (a), and the use of a zinc oxide as the basic inorganic metal compound of component (c).

In addition to the above essential components, to improve the feel of the golf ball on impact and to further enhance the ball's rebound, the intermediate layer material may additionally include, as optional components, various thermoplastic elastomers and thermoplastic resins other than component (a). Illustrative examples of such thermoplastic elastomers include polyolefin elastomers, polyester elastomers, polyurethane elastomers, polyamide elastomers and polystyrene elastomers. The use of a polyolefin elastomer or a polyester elastomer is especially preferred.

More specific examples include linear low-density polyethylene, low-density polyethylene, high-density polyethylene, polypropylene, rubber-reinforced olefin polymers, flexomers, plastomers, thermoplastic elastomers containing acid modifiers (styrene-based block copolymers, hydrogenated polybutadiene ethylene propylene rubbers), dynamically vulcanized elastomers, ethylene acrylate, and ethylene vinyl acetate. Examples of commercial products include HPR manufactured by DuPont-Mitsui Polychemicals Co., Ltd., and Dynaron manufactured by JSR Corporation.

It is recommended that the amount of above optional ingredients such as polyolefin elastomers and polyester elastomers per 100 parts by weight of essential components (a) to (c) be generally not more than 100 parts by weight, preferably not more than 80 parts by weight, more preferably not more than 60 parts by weight, even more preferably not more than 50 parts by weight, and most preferably not more than 40 parts by weight, but 0 or more part by weight, preferably at least 5 parts by weight, more preferably at least 10 parts by weight, even more preferably at least 15 parts by weight, and most preferably at least 20 parts by weight.

Various additives may also be optionally included in the intermediate layer material. Examples of such additives include pigments, dispersants, antioxidants, ultraviolet absorbers and light stabilizers. More specific examples of such additives include inorganic fillers such as zinc oxide, barium sulfate and titanium dioxide. These inorganic fillers may be included in an amount of generally at least 1 wt % but not more than 30 wt %, and preferably not more than 20 wt %.

The intermediate layer has a thickness of at least 0.5 mm, preferably at least 0.7 mm, more preferably at least 0.8 mm, and even more preferably at least 1.0 mm, but not more than 2.5 mm, preferably not more than 2.0 mm, more preferably not more than 1.7 mm, and even more preferably not more than 1.3 mm. If the intermediate layer is too thin, the golf ball will have a lower durability to repeated impact. On the other hand, if this layer is too thick, the ball will have too hard a feel on impact and a much smaller rebound.

The cover layer of the inventive golf ball has a surface Shore D hardness, as measured directly with a Shore D durometer when the cover layer encloses the core and intermediate layer, of at least 40, preferably at least 45, more preferably at least 48, and even more preferably at least 50, but not more than 63, preferably not more than 61, more preferably not more than 59, and even more preferably not more than 57. A cover layer which is too soft makes the ball overly receptive to spin, resulting in a shorter carry.

A cover layer which is too hard causes an excessive decline in the spin rate, leading to poor controllability, lowers the durability to cracking with repeated impact and the scuff resistance, and worsens the feel of the ball on impact, particularly in what golfers refer to as the "short game" or when hit with a putter.

The cover layer can be made of, for example, a thermoplastic or thermoset polyurethane, ionomer resin, polyester elastomer or polyamide elastomer. However, it is preferable for the cover to be made primarily of a thermoplastic polyurethane. In this way, there can be obtained a golf ball having excellent scuff resistance and excellent spin stability on shots known as "fliers."

The thermoplastic polyurethane is not subject to any particular limitation, provided it is a thermoplastic elastomer consisting primarily of polyurethane. However, thermoplastic elastomers with a structure having soft segments made of a polymeric polyol and hard segments made of a chain extender and a diisocyanate are preferred.

Any polymeric polyol employed in the prior art relating to thermoplastic polyurethane materials may be used without particular limitation. Examples include polyester polyols, polyether polyols, copolyester polyols and polycarbonate polyols, any of which may be used with good results. Of these, polyether polyols are preferred for the preparation of thermoplastic polyurethanes having excellent rebound resilience and low-temperature properties, and polyester polyols are preferred for the heat resistance and broad molecular design capabilities they provide.

Illustrative examples of polyester polyols include polycaprolactone glycol, poly(ethylene 1,4-adipate) glycol and poly(butylene 1,4-adipate) glycol.

Suitable examples of polyether polyols include polytetramethylene glycol and polypropylene glycol. Polytetramethylene glycol is preferred.

One example of a suitable copolyester polyol is poly(diethylene glycol adipate) glycol.

One example of a suitable polycarbonate polyol is poly(hexanediol-1,6-carbonate) glycol.

These polymeric polyols have a number-average molecular weight of generally at least 500, preferably at least 1,000, and more preferably at least 2,000, but generally not more than 5,000, preferably not more than 4,000, and more preferably not more than 3,000.

As used herein, "number-average molecular weight" refers to the polystyrene-equivalent molecular weight obtained using gel permeation chromatography.

Any diisocyanate employed in the prior art relating to thermoplastic polyurethane materials may be used without particular limitation. Illustrative examples include 4,4'-diphenylmethane diisocyanate, 2,4-toluene diisocyanate, 2,6-toluene diisocyanate, hexamethylene diisocyanate, 2,2,4- and 2,4,4-trimethylhexamethylene diisocyanate, lysine diisocyanate and tolylene diisocyanate.

However, depending on the type of isocyanate used, control of the crosslinking reaction during injection molding can be difficult. In the practice of the invention, the use of 4,4'-diphenylmethane diisocyanate is preferred for good compatibility with the subsequently described isocyanate mixture.

Any chain extender employed in the prior art relating to thermoplastic polyurethane materials may be used without particular limitation. For instance, use may be made of any ordinary polyol or polyamine. Specific examples include 1,4-butylene glycol, 1,2-ethylene glycol, 1,3-butanediol, 1,6-hexanediol, 2,2-dimethyl-1,3-propanediol, dicyclohexylmethylmethanediamine (hydrogenated MDI) and isophoronediamine (IPDA).

These chain extenders have a number-average molecular weight of generally at least 20, but generally not more than 15,000.

No limitation is imposed on the specific gravity of the thermoplastic polyurethane, so long as it is suitably controlled within a range that allows the objects of the invention to be achieved. The specific gravity is preferably from 1.0 to 1.3, and most preferably from 1.1 to 1.25.

The thermoplastic polyurethane used in the invention may be a commercial product. Illustrative examples include Pandex T8290, T8295 and T8260 (all manufactured by DIC Bayer Polymer, Ltd.), and Resamine 2593 and 2597 (manufactured by Dainichi Seika Colour & Chemicals Mfg. Co., Ltd.).

The resin which forms the cover layer may be composed of the above-described thermoplastic polyurethane, but it is also possible to use a thermoplastic polyurethane composition made up of the above-described thermoplastic polyurethane (A) and an isocyanate mixture (B).

The isocyanate mixture (B) is preferably one prepared by dispersing (b-1) a compound having as functional groups at least two isocyanate groups per molecule in (b-2) a thermoplastic resin that is substantially non-reactive with isocyanate.

The compound having as functional groups at least two isocyanate groups per molecule which serves as component (b-1) may be an isocyanate compound used in the prior art relating to polyurethanes, such as an aromatic isocyanate, a hydrogenated aromatic isocyanate, an aliphatic diisocyanate or an alicyclic diisocyanate.

Examples of aromatic isocyanates include 2,4-toluene diisocyanate, 2,6-toluene diisocyanate, mixtures of 2,4- and 2,6-toluene diisocyanate, 4,4'-diphenylmethane diisocyanate, m-phenylene diisocyanate, and 4,4'-diphenyl diisocyanate.

An example of a hydrogenated aromatic isocyanate is dicyclohexylmethane diisocyanate.

Examples of aliphatic diisocyanates include tetramethylene diisocyanate, hexamethylene diisocyanate and octamethylene diisocyanate.

An example of an alicyclic diisocyanate is isophorone diisocyanate.

To assure good reactivity and work safety, the use of 4,4'-diphenylmethane diisocyanate is preferred.

The thermoplastic resin that is substantially non-reactive with isocyanate which serves as component (b-2) is preferably a resin having a low water absorption and excellent compatibility with thermoplastic polyurethane materials. Illustrative, non-limiting, examples of such resins include polystyrene resins, polyvinyl chloride resins, ABS resins, polycarbonate resins and polyester thermoplastic elastomers (e.g., polyether-ester block copolymers, polyester-ester block copolymers).

For good rebound resilience and strength, the use of a polyester thermoplastic elastomer is especially preferred. No particular limitation is imposed on the polyester thermoplastic elastomer, provided it is a thermoplastic elastomer composed primarily of polyester. The use of a polyester-based block copolymer composed primarily of high-melting crystalline polymer segments made of crystalline aromatic polyester units and low-melting polymer segments made of aliphatic polyether units and/or aliphatic polyester units is preferred.

Preferred examples of the high-melting crystalline polymer segments made of crystalline aromatic polyester units include polybutylene terephthalate derived from terephthalic acid and/or dimethyl terephthalate in combination with 1,4-butanediol. Other suitable, non-limiting, examples include polyesters derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid, or ester-forming derivatives thereof in combination with a diol having a molecular weight of up to 300, such as an aliphatic diol (e.g., ethylene glycol, trimethylene glycol, pentamethylene glycol, hexamethylene glycol, neopentyl glycol, decamethylene glycol), an alicyclic diol (e.g., 1,4-cyclohexanedimethanol, tricyclodecanedimethylol) or an aromatic diol (e.g., xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl and 4,4'-dihydroxy-p-quarterphenyl). Use can also be made of any copolymeric polyester obtained using two or more of these dicarboxylic acid components and diol components.

In addition, polycarboxylic acid components, polyoxy components and polyhydroxy components having a functionality of three or more can be copolymerized therein within a range of up to 5 mol %.

In the low-melting polymer segments made of aliphatic polyether units and/or aliphatic polyester units, illustrative examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycols, and copolymers of ethylene oxide and tetrahydrofuran. Illustrative examples of the aliphatic polyester include poly (ε-caprolactone), polyenantholactone, polycaprylolactone, poly(butylene adipate) and poly(ethylene adipate).

The low-melting polymer segments have a number-average molecular weight in the copolymerized state of preferably about 300 to 6,000.

In cases where the polyester thermoplastic elastomer used is one composed primarily of high-melting crystalline polymer segments made of crystalline aromatic polyester units and low-melting polymer segments made of aliphatic polyether units and/or aliphatic polyester units, it is advantageous to adjust the amount of low-melting polymer segments made of aliphatic polyether units and/or aliphatic polyester units copolymerized relative to the amount of high-melting crystalline polymer segment made of crystalline aromatic polyester units to generally at least 15 wt %, and preferably at least 50 wt %, but not more than 90 wt %. If the proportion of low-melting polymer segments made of aliphatic polyether units and/or aliphatic polyester units is too high, the thermoplastic copolymer may lack adequate melt characteristics, which can make it difficult to achieve uniform mixture during melt blending with the other components. On the other hand, if the proportion is too low, sufficient flexibility and rebound may not be achieved.

Examples of polyester thermoplastic elastomers preferred for use in the invention include those in the Hytrel series made by DuPont-Toray Co., Ltd., and those in the Primalloy series made by Mitsubishi Chemical Corporation.

When the isocyanate mixture (B) is prepared, it is desirable for the relative proportions of above components (b-1) and (b-2), expressed as the weight ratio (b-1)/(b-2), to be within a range of 100/5 to 100/100, and especially 100/10 to 100/40. If the amount of component (b-1) relative to component (b-2) is too low, more isocyanate mixture (B) must be added to achieve an amount of addition adequate for the crosslinking reaction with the thermoplastic polyurethane (A). In such cases, component (b-2) exerts a large effect, which may compromise the physical properties of the thermoplastic polyurethane composition serving as the cover stock. If, on the other hand, the amount of component (b-1) is too high, component (b-1) may cause slippage to occur during mixing, making it difficult to prepare the thermoplastic polyurethane composition used as the cover stock.

The isocyanate mixture (B) can be prepared by blending component (b-1) into component (b-2) and thoroughly working together these components at a temperature of 130 to 250° C. using mixing rollers or a Banbury mixer, then either pelletizing or cooling and grinding.

The isocyanate mixture (B) used to work the invention may be a commercial product, a preferred example of which is Crossnate EM30 (made by Dainichi Seika Colour & Chemicals Mfg. Co., Ltd.).

Above component (B) is included in an amount, per 100 parts by weight of component (A), of generally at least 1 part by weight, preferably at least 5 parts by weight, and more preferably at least 10 parts by weight, but generally not more than 100 parts by weight, preferably not more than 50 parts by weight, and more preferably not more than 30 parts by weight. Too little component (B) may make it impossible to achieve a sufficient crosslinking reaction, so that no enhancement of the physical properties occurs. On the other hand, too much may result in greater discoloration over time or due to the effects of heat and ultraviolet light, and may also have other undesirable effects, such as lowering the rebound.

In addition to the above resin components, if necessary, the cover stock in the invention may also include various additives. Examples of such additives include pigments, dispersants, antioxidants, ultraviolet absorbers, ultraviolet stabilizers, parting agents, plasticizers and inorganic fillers (e.g., zinc oxide, barium sulfate, titanium dioxide, tungsten).

When such additives are included, the amount of addition may be selected from within ranges that do not compromise the objects of the invention. Typically, such additives are included in an amount, per 100 parts by weight of the thermoplastic polyurethane serving as the essential component, of preferably at least 0.1 part by weight, and more preferably at least 0.5 part by weight, but generally not more than 10 parts by weight, and preferably not more than 5 parts by weight.

In the practice of the invention, molding of the golf ball cover using the thermoplastic polyurethane can typically be carried out by, for example, employing an injection molding machine to mold the cover over the intermediate layer enclosing the core.

The molding temperature is generally in a range of 150 to 250° C.

If necessary, an adhesive may be used between the intermediate layer and the cover to provide the inventive golf ball with a better durability to impact. Any suitable adhesive may be selected, insofar as the objects of the invention can be attained. Preferred examples of such adhesives include chlorinated polyolefin adhesives (e.g., RB182 Primer, made by Nippon Bee Chemical Co., Ltd.), urethane resin adhesives (e.g., Resamine D6208, made by Dainichi Seika Colour & Chemicals Mfg. Co., Ltd.), epoxy resin adhesives, vinyl resin adhesives and rubber adhesives. The thickness of the adhesive layer is not subject to any particular limitation, although a thickness of 0.1 to 30 μm is preferred. It is also acceptable to use the adhesive on only part of the intermediate layer surface.

The use of such an adhesive can be omitted by adding a suitable amount of trimethylolpropane to the intermediate layer.

The cover layer has a thickness of at least 0.2 mm, preferably at least 0.4 mm, more preferably at least 0.6 mm, and even more preferably at least 0.8 mm, but not more than 2.5 mm, preferably not more than 2.0 mm, more preferably not more than 1.6 mm, and even more preferably not more than 1.2 mm. A cover which is too thick, particularly on long shots such as with a driver in which the ball incurs a large deformation, will subject the ball to excessive spin, reducing the carry. On the other hand, a cover which is too thin will worsen the feel of the ball upon impact in the "short game" and will reduce spin stability on "flier" type shots.

In the inventive golf ball, the cover layer has a lower surface hardness (i.e., it is softer) than the intermediate layer. It is necessary for this difference, represented as (surface hardness of intermediate layer)−(surface hardness of cover layer), when expressed in Shore D hardness units, to be at least 2, preferably at least 4, more preferably at least 6, and even more preferably at least 8, but not more than 30, preferably not more than 20, more preferably not more than 15, and even more preferably not more than 13. If this difference is too large, the scuff resistance and durability to repeated impact are compromised, the feel of the ball in the short game worsens, and spin stability on fliers decreases. On the other hand, if the difference is too small, the spin increases excessively and rebound by the ball diminishes, resulting in a shorter carry.

In addition, it is preferable for the intermediate layer to have a higher surface hardness than the core.

The inventive golf ball has a deflection, when subjected to a load of 980 N (100 kg), of at least 2.0 mm, preferably at least 2.1 mm, more preferably at least 2.2 mm, and even more preferably at least 2.3 mm, but not more than 4.0 mm, preferably not more than 3.5 mm, more preferably not more than 3.0 mm, and even more preferably not more than 2.8 mm. At a deflection of less than 2.0 mm, the feel of the ball upon impact is so hard that the ball cannot be used, in addition to which the spin increases, shortening the distance traveled by the ball. At a deflection of more than 4.0 mm, rebound by the ball decreases, resulting in a poor carry.

Numerous dimples are formed on the surface of the inventive golf ball (i.e., the surface of the cover layer). The number of dimples is preferably 250 to 390, and especially 300 to 370. In the invention, a number of dimples within this range makes the ball receptive to lift, enabling the carry to be increased particularly when the ball is hit with a driver. The dimples are preferably circular in shape as seen from above, with a diameter of 2 to 6 mm, and especially 2.5 to 5.0 mm. The dimples have a depth of preferably 0.05 to 0.30 mm, although the average depth is set in a range of 0.125 to 0.150 mm to achieve a proper trajectory. It is recommended that the dimples be formed in at least four types, and generally about four to six types, of mutually differing diameter and/or depth so as to more easily increase the surface coverage of the dimples on the ball.

"Average depth," as used herein, refers to the mean value for the depths of all the dimples. The diameter of a dimple is measured as the distance across the dimple between positions where the dimple region meets land (non-dimple) regions, that is, between the highest points of the dimple region. The golf ball is usually painted, in which case the dimple diameter refers to the diameter after the surface of the ball has been covered with paint. The depth of a dimple is measured by interconnecting positions where the dimple joins the surrounding land so as to define an imaginary plane, and determining the vertical distance from a center position on the plane to the base (deepest position) of the dimple.

If necessary, the surface of the multi-piece solid golf ball of the invention may be marked, painted and subjected to surface preparation.

The multi-piece solid golf ball of the invention can be manufactured in accordance with the Rules of Golf for use in competitive play, in which case the ball may be formed to a diameter of not less than 42.67 mm and a weight of not more than 45.93 g. The upper limit in the diameter is generally not more than 44.0 mm, preferably not more than 43.5 mm, and more preferably not more than 43.0 mm. The lower limit in the weight is generally not less than 44.5 g, preferably not less than 45.0 g, more preferably not less than 45.1 g, and even more preferably not less than 45.2 g.

EXAMPLES

The following examples and comparative examples are provided by way of illustration and not by way of limitation.

Examples and Comparative Examples

Using the cores formulated as shown in Tables 1 and 2 and the intermediate layers and covers formulated as shown in Table 4, three-piece solid golf balls in the examples and comparative examples shown in Table 5 were produced.

In each case, the core was fabricated by using a kneader (Moriyama Manufacturing Co., Ltd.) to knead at 50 to 130° C. the rubber composition shown in Table 1, then vulcanizing the composition at 150 to 170° C. for 10 to 20 minutes.

The deflection of the resulting cores and golf balls, and the Shore D hardness of the intermediate layer and the cover were measured as described below. The rebound and flight distance (spin rate, total distance) of the ball, the spin rate of the ball on approach shots, and the feel of the ball when shot with a driver and a putter were measured as described below. The results are presented in Table 5.

TABLE 1

| Ingredients (parts by weight) | (1) | (2) | (3) | (4) | (5) | (6) | (7) | (8) |
|---|---|---|---|---|---|---|---|---|
| Core formulation | | | | | | | | |
| (A-1) BR01 | 60 | | | | | | 100 | |
| BR730 | | 80 | 60 | 40 | 20 | 30 | | 100 |
| BR51 | | | | | | 30 | | |
| (A-2) Methacryloxy-modified silicone rubber powder | 40 | 20 | 40 | 60 | 80 | 40 | | |
| Unmodified silicone rubber powder | | | | | | | | |
| Perhexa C-40 (half-life. 40) | 0.6 | 0.3 | 0.3 | 0.3 | 0.3 | 0.3 | 0.6 | 0.3 |
| True amount of above added | 0.24 | 0.12 | 0.12 | 0.12 | 0.12 | 0.12 | 0.24 | 0.12 |
| Percumil D (half-life, 480) | 0.6 | 0.3 | 0.3 | 0.3 | 0.3 | 0.3 | 0.6 | 0.3 |
| Zinc oxide | 14.7 | 18.3 | 15.3 | 12.2 | 9.2 | 15.3 | 21.1 | 21.7 |
| Antioxidant: Nocrac NS-6 | 0.1 | 0.1 | 0.1 | 0.1 | 0.1 | 0.1 | 0.1 | 0.1 |
| Zinc acrylate | 31 | 30 | 30 | 30 | 30 | 30 | 30 | 29 |

Note: The Perhexa C-40 was a 40 wt % dilution, so the true amount of addition (the amount of addition assuming the Perhexa C-40 to be a 100 wt % product) is also shown.

TABLE 2

| Ingredients (parts by weight) | (9) | (10) | (11) | (12) | (13) | (14) | (15) | (16) |
|---|---|---|---|---|---|---|---|---|
| Core formulation | | | | | | | | |
| (a-1) BR01 | | | | | | | | |
| BR730 | 60 | 60 | 60 | 60 | 60 | 60 | 60 | 60 |
| BR51 | | | | | | | | |
| (a-2) Methacryloxy-modified silicone rubber powder | | | 40 | 40 | 40 | 40 | 40 | 40 |
| Unmodified silicone rubber powder | 40 | 40 | | | | | | |
| Perhexa C-40 (half-life, 40) | 0.3 | 0.3 | 0.3 | 0.3 | 0.3 | 0.3 | 0.3 | 0.3 |
| True amount of above added | 0.12 | 0.12 | 0.12 | 0.12 | 0.12 | 0.12 | 0.12 | 0.12 |
| Percumil D (half-life, 480) | 0.3 | 0.3 | 0.3 | 0.3 | 0.3 | 0.3 | 0.3 | 0.3 |
| Zinc oxide | 15.3 | 13.4 | 6.3 | 21.8 | 23.1 | 68.5 | 9.2 | 21.3 |
| Antioxidant: Nocrac NS-6 | 0.1 | 0.1 | 0.1 | 0.1 | 0.1 | 0.1 | 0.1 | 0.1 |
| Zinc acrylate | 30 | 34.5 | 31 | 28 | 30.5 | 34 | 45 | 15 |

Note: The Perhexa C-40 was a 40 wt % dilution, so the true amount of addition (the amount of addition assuming the Perhexa C-40 to be a 100 wt % product) is also shown.

TABLE 3

| Type | Manu-facturer | Cata-lyst | cis-1,4 content | 1,2-vinyl content | Mooney viscosity | Mw/Mn |
|---|---|---|---|---|---|---|
| BR BR01 | JSR | Ni | 96 wt % | 2.5 wt % | 46 | 4.2 |
| BR730 | | Nd | 96 wt % | 1.3 wt % | 55 | 3 |
| BR51 | | Nd | 96 wt % | 1.3 wt % | 35.5 | 2.8 |

Methacryloxy-modified silicone rubber powder: DY33-719, produced by Dow Corning Toray Silicone Co., Ltd.
Unmodified silicone rubber powder: TREFIL E-604, produced by Dow Corning Toray Silicone Co., Ltd.
Antioxidant: Nocrac NS-6, produced by Ouchi Shinko Chemical Industry Co., Ltd.
Zinc acrylate: Produced by Nihon Jyoryu Kogyo Co., Ltd.
Perhexa C-40: 1,1-Bis(t-butylperoxy)cyclohexane produced by NOF Corporation.
Percumil D: Dicumyl peroxide produced by NOF Corporation.

TABLE 4

| Ingredients (pbw) | A | B | C | D | E | F | G | H |
|---|---|---|---|---|---|---|---|---|
| Intermediate layer/cover | | | | | | | | |
| Himilan 1605 | | 100 | | 68.75 | | | | 50 |
| Himilan 1706 | | | | | | | | 50 |
| Surlyn 7930 | 100 | | | | | | | |
| AM7317 | | | 100 | | | | | |
| Hytrel 4001 | | | | | 100 | | | |
| Dynaron 6100P | | | | 31.25 | | | | |
| Pandex T8260 | | | | | | 50 | | |
| Pandex T8295 | | | | | | 50 | 100 | |
| Behenic acid | | | | 18 | | | | |
| Calcium hydroxide | | | | 2.3 | | | | |
| Trimethylol-propane | 0.8 | 0.8 | 0.8 | | | | | |
| Polytail H | | | | 2 | | | | |
| Titanium dioxide | | | | | | 4 | 4 | 4.8 |
| Polyethylene wax | | | | | | 1.5 | 1.5 | 2 |
| Isocyanate compound | | | | | | 10 | 10 | |

Himilan: Ionomer resins produced by DuPont-Mitsui Polychemicals Co., Ltd.
Surlyn: An ionomer resin produced by E.I. DuPont de Nemours and Company.
AM7317: A zinc ionomer resin with an acid content of 18% produced by DuPont-Mitsui Polychemicals Co., Ltd.
Dynaron: A hydrogenated butadiene-styrene block copolymer produced by JSR Corporation.
Pandex: Thermoplastic polyurethane elastomers produced by Dainippon Ink & Chemicals, Inc.

TABLE 5

| | Example | | | | | | | | | |
|---|---|---|---|---|---|---|---|---|---|---|
| | 1 | 2 | 3 | 4 | 5 | 6 | 7 | 8 | 9 | 10 |
| Golf ball | | | | | | | | | | |
| Core | | | | | | | | | | |
| Type | (1) | (2) | (3) | (4) | (5) | (6) | (3) | (3) | (3) | (3) |
| Diameter (mm) | 37.3 | 37.3 | 37.3 | 37.3 | 37.3 | 37.3 | 37.3 | 37.3 | 37.3 | 37.3 |
| Deflection (mm) under 980 N (100 kg) load | 3.6 | 3.5 | 3.6 | 3.7 | 3.5 | 3.6 | 3.6 | 3.6 | 3.6 | 3.6 |

TABLE 5-continued

|  | Example | | | | | | | | | |
|---|---|---|---|---|---|---|---|---|---|---|
|  | 1 | 2 | 3 | 4 | 5 | 6 | 7 | 8 | 9 | 10 |
| Intermediate layer | | | | | | | | | | |
| Type | A | A | A | A | A | A | B | C | D | A |
| Surface Shore D hardness | 68 | 68 | 68 | 68 | 68 | 68 | 65 | 71 | 59 | 68 |
| Thickness (mm) | 1.7 | 1.7 | 1.7 | 1.7 | 1.7 | 1.7 | 1.7 | 1.7 | 1.7 | 1.7 |
| Cover | | | | | | | | | | |
| Type | F | F | F | F | F | F | F | F | F | G |
| Surface Shore D hardness | 59 | 59 | 59 | 59 | 59 | 59 | 58.5 | 59.5 | 57.5 | 56.5 |
| Specific gravity | 1.16 | 1.16 | 1.16 | 1.16 | 1.16 | 1.16 | 1.16 | 1.16 | 1.16 | 1.16 |
| Thickness (mm) | 0.98 | 0.98 | 0.98 | 0.98 | 0.98 | 0.98 | 0.98 | 0.98 | 0.98 | 0.98 |
| Ball | | | | | | | | | | |
| Diameter (mm) | 42.7 | 42.7 | 42.7 | 42.7 | 42.7 | 42.7 | 42.7 | 42.7 | 42.7 | 42.7 |
| Weight (g) | 45.6 | 45.6 | 45.6 | 45.6 | 45.6 | 45.6 | 45.6 | 45.6 | 45.6 | 45.6 |
| Dimples | | | | | | | | | | |
| Number of dimples | 330 | 330 | 330 | 330 | 330 | 330 | 330 | 330 | 330 | 330 |
| Average dimple depth (mm) | 0.136 | 0.136 | 0.136 | 0.136 | 0.136 | 0.136 | 0.136 | 0.136 | 0.136 | 0.136 |
| Types of dimples | 5 | 5 | 5 | 5 | 5 | 5 | 5 | 5 | 5 | 5 |
| Test Results | | | | | | | | | | |
| Hardness | | | | | | | | | | |
| Deflection (mm) under 980 N (100 kg) load | 2.6 | 2.6 | 2.6 | 2.6 | 2.6 | 2.6 | 2.7 | 2.4 | 2.9 | 2.6 |
| Rebound | | | | | | | | | | |
| Initial velocity at 23° C. (m/s) | 76.8 | 76.8 | 77.0 | 77.3 | 77.5 | 76.9 | 76.8 | 77.4 | 76.8 | 77.0 |
| Initial velocity at 5° C. (m/s) | 76.4 | 76.3 | 76.6 | 77.0 | 77.2 | 76.5 | 76.4 | 77.0 | 76.5 | 76.6 |
| Decrease in initial velocity (m/s) | 0.4 | 0.5 | 0.4 | 0.3 | 0.3 | 0.4 | 0.4 | 0.4 | 0.3 | 0.4 |
| Flight distance | | | | | | | | | | |
| HS 35 Spin (rpm) | 3020 | 3040 | 3030 | 3010 | 3030 | 3030 | 3040 | 2990 | 3080 | 3050 |
| HS 35 Total distance (m) | 173.0 | 173.0 | 173.5 | 175.0 | 176.0 | 173.0 | 173.0 | 175.5 | 173.0 | 173.5 |
| HS 45 Spin (rpm) | 2710 | 2730 | 2720 | 2700 | 2720 | 2720 | 2730 | 2680 | 2770 | 2740 |
| HS 45 Total distance (m) | 228.5 | 228.5 | 229.5 | 231.5 | 232.5 | 229.0 | 229.0 | 232.5 | 229.0 | 229.5 |
| HS 55 Spin (rpm) | 2810 | 2930 | 2820 | 2800 | 2820 | 2820 | 2830 | 2780 | 2870 | 2840 |
| HS 55 Total distance (m) | 283.5 | 283.5 | 284.5 | 287.0 | 288.5 | 284.0 | 283.5 | 288.0 | 283.5 | 284.5 |
| Approach shot | | | | | | | | | | |
| HS 20 Spin (rpm) | 6960 | 6940 | 6950 | 6950 | 6960 | 6940 | 6970 | 6900 | 7020 | 7080 |
| Feel | | | | | | | | | | |
| Driver | good | good | good | good | good | good | good | good | good | good |
| Putter | good | good | good | good | good | good | good | good | good | good |

TABLE 6

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Golf ball | | | | | | | | | | |
| Core | | | | | | | | | | |
| Type | (7) | (8) | (9) | (10) | (11) | (12) | (13) | (14) | (15) | (16) |
| Diameter (mm) | 37.3 | 37.3 | 37.3 | 37.3 | 37.3 | 37.3 | 30.7 | 28 | 37.3 | 37.3 |
| Deflection (mm) under 980 N (100 kg) load | 3.6 | 3.6 | 4.5 | 3.6 | 3.6 | 3.6 | 3.6 | 3.6 | 1.8 | 7.0 |

TABLE 6-continued

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Intermediate layer | | | | | | | | | | |
| Type | A | A | A | A | E | A | A | A | A | A |
| Surface Shore D hardness | 68 | 68 | 68 | 68 | 40 | 68 | 68 | 68 | 68 | 68 |
| Thickness (mm) | 1.7 | 1.7 | 1.7 | 1.7 | 1.7 | 1.7 | 3.0 | 6.4 | 1.7 | 1.7 |
| Cover | | | | | | | | | | |
| Type | F | F | F | F | F | H | F | F | F | F |
| Surface Shore D hardness | 59 | 59 | 59 | 59 | 54 | 65 | 59 | 59 | 59 | 59 |
| Specific gravity | 1.16 | 1.16 | 1.16 | 1.16 | 1.16 | 0.98 | 1.16 | 1.16 | 1.16 | 1.16 |
| Thickness (mm) | 0.98 | 0.98 | 0.98 | 0.98 | 0.98 | 0.98 | 2.99 | 0.98 | 0.98 | 0.98 |
| Ball | | | | | | | | | | |
| Diameter (mm) | 42.7 | 42.7 | 42.7 | 42.7 | 42.7 | 42.7 | 42.7 | 42.7 | 42.7 | 42.7 |
| Weight (g) | 45.6 | 45.6 | 45.6 | 45.6 | 45.5 | 45.6 | 45.5 | 45.5 | 45.6 | 45.6 |
| Dimples | | | | | | | | | | |
| Number of dimples | 330 | 330 | 330 | 330 | 330 | 330 | 330 | 330 | 330 | 330 |
| Average dimple depth (mm) | 0.136 | 0.136 | 0.136 | 0.136 | 0.136 | 0.136 | 0.136 | 0.136 | 0.136 | 0.136 |
| Types of dimples | 5 | 5 | 5 | 5 | 5 | 5 | 5 | 5 | 5 | 5 |
| Test Results | | | | | | | | | | |
| Hardness | | | | | | | | | | |
| Deflection (mm) under 980 N (100 kg) load | 2.6 | 2.6 | 3.1 | 2.6 | 3.5 | 2.3 | 1.9 | 1.5 | 1.6 | 4.4 |
| Rebound | | | | | | | | | | |
| Initial velocity at 23° C. (m/s) | 76.3 | 76.5 | 75.8 | 76.0 | 76.3 | 77.4 | 76.6 | 76.5 | 77.5 | 76.1 |
| Initial velocity at 5° C. (m/s) | 75.6 | 75.8 | 75.5 | 75.6 | 76.0 | 76.8 | 76.0 | 75.8 | 76.9 | 76.0 |
| Decrease in initial velocity (m/s) | 0.7 | 0.7 | 0.3 | 0.4 | 0.3 | 0.6 | 0.6 | 0.7 | 0.6 | 0.1 |
| Flight distance | | | | | | | | | | |
| HS 35 Spin (rpm) | 3020 | 3030 | 2900 | 3030 | 3240 | 2620 | 3150 | 2990 | 3280 | 2580 |
| HS 35 Total distance (m) | 168.5 | 169.0 | 166.0 | 167.0 | 166.0 | 175.0 | 171.0 | 172.5 | 174.5 | 165.5 |
| HS 45 Spin (rpm) | 2710 | 2720 | 2600 | 2720 | 2910 | 2350 | 2830 | 2680 | 2950 | 2320 |
| HS 45 Total distance (m) | 223.0 | 224.0 | 219.5 | 221.0 | 219.5 | 231.5 | 226.5 | 228.0 | 231.0 | 219.0 |
| HS 55 Spin (rpm) | 2810 | 2820 | 2700 | 2820 | 3020 | 2440 | 2930 | 2780 | 3050 | 2400 |
| HS 55 Total distance (m) | 276.5 | 277.5 | 272.0 | 274.0 | 272.0 | 287.0 | 280.5 | 282.5 | 286.5 | 271.5 |
| Approach shot | | | | | | | | | | |
| HS 20 Spin (rpm) | 6960 | 6950 | 6710 | 6950 | 7030 | 5760 | 7310 | 7430 | 7470 | 6010 |
| Feel | | | | | | | | | | |
| Driver | good | good | good | good | NG | good | NG | NG | NG | NG |
| Putter | good | good | good | good | good | NG | good | NG | NG | good |

The invention claimed is:

1. A multi-piece solid golf ball comprised of a solid core, at least one intermediate layer and a cover, which golf ball is characterized in that the core is made of a molded and vulcanized material obtained by vulcanizing a rubber composition comprising (A) a base rubber that includes (a-1) a methacryloxy- and/or acryloxy-modified silicone polymer, and comprising also an unsaturated carboxylic acid and/or a metal salt thereof, an organic peroxide and an inorganic filler, and has a diameter of 30 to 40 mm and a deflection under a 980 N (100 kg) load of 2.5 to 6.0 mm; the intermediate layer is made primarily of a thermoplastic resin and has a thickness of 0.5 to 2.5 mm and a surface Shore D hardness of 45 to 75; the cover has a thickness of 0.2 to 2.5 mm and a surface Shore D hardness of 40 to 63 which is lower than the surface Shore D hardness of the intermediate layer; and the golf ball has a deflection under a 980 N (100 kg) load of 2.0 to 4.0 mm.

2. The multi-piece solid golf ball of claim 1, wherein the methacryloxy- and/or acryloxy-modified silicone polymer (a-1) is a methacryloxy and/or acryloxy-modified silicone rubber powder.

3. The multi-piece solid golf ball of claim 1, wherein the base rubber (A) includes also (a-2) an organic peroxide-crosslinkable rubber other than the methacryloxy- and/or acryloxy-modified silicone polymer.

4. The multi-piece solid golf ball of claim 3, wherein component (a-2) is a polybutadiene having a cis-1,4 content of at least 40 wt %.

5. The multi-piece solid golf ball of claim 4, wherein component (a-2) is a polybutadiene which has a cis-1,4 content of at least 60 wt % and has been synthesized using a rare-earth catalyst.

6. The multi-piece solid golf ball of claim 5, wherein component (a-2) is a modified polybutadiene rubber obtained by synthesis using a neodymium catalyst followed by reaction with a terminal modifier.

7. The multi-piece solid golf ball of claim 1, wherein the intermediate layer has a higher surface Shore D hardness than the core and the cover.

8. The multi-piece solid golf ball of claim 7, wherein the cover and the intermediate layer have a surface Shore D hardness difference therebetween of 2 to 30.

9. The multi-piece solid golf ball of claim 1, wherein the cover is composed primarily of a thermoplastic polyurethane.

* * * * *